Dec. 18, 1928.

W. H. DAY 1,695,322

INDEX OR FILE

Filed July 27, 1925   3 Sheets-Sheet 1

Inventor
William H. Day
By Henry E. Rockwell
Attorney

Dec. 18, 1928.

W. H. DAY 1,695,322

INDEX OR FILE

Filed July 27, 1925    3 Sheets-Sheet 2

Inventor
William H. Day
By Henry E. Rockwell
Attorney

Dec. 18, 1928.  
W. H. DAY  
INDEX OR FILE  
Filed July 27, 1925
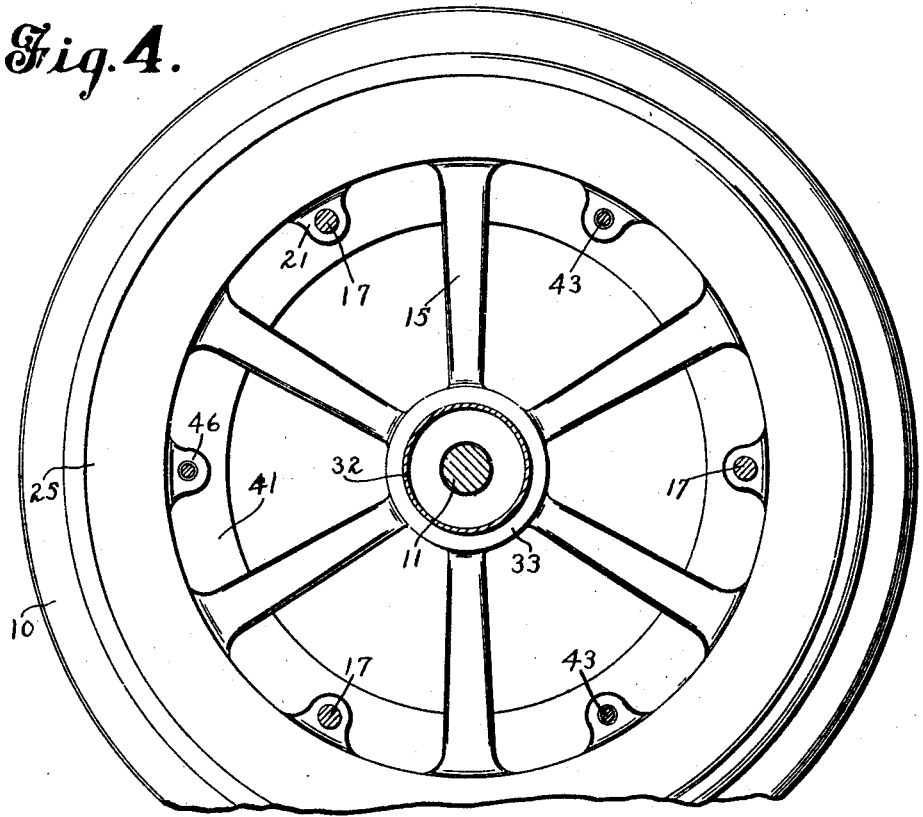
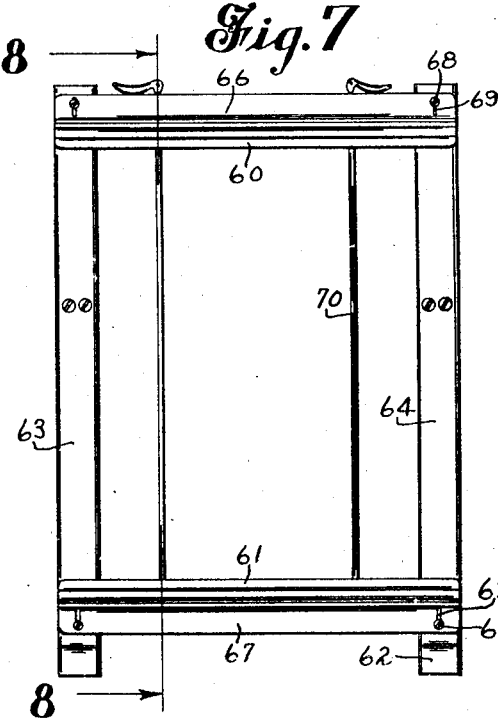
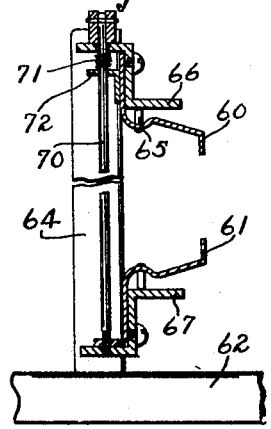
Inventor  
William H. Day  
By Henry E. Cockwell  
Attorney Patented Dec. 18, 1928.

1,695,322

UNITED STATES PATENT OFFICE.

WILLIAM H. DAY, OF EAST HAVEN, CONNECTICUT, ASSIGNOR, BY MESNE ASSIGNMENTS, TO REMINGTON RAND INC., OF NEW YORK, N. Y., A CORPORATION OF DELAWARE.

INDEX OR FILE.

Application filed July 27, 1925. Serial No. 46,337.

This invention relates to indexes or files, and more particularly to index or file equipment wherein a plurality of index frames or leaves are swingably mounted upon a supporting device. The invention contemplates improvements in such an index frame supporting device, especially improvements in one wherein the frames or leaves are readily detachable therefrom.

Index equipment of the above types is generally used where continuous reference is desired to the record bearing cards mounted upon the swingable frames or leaves. The leaves or frames are usually connected to a supporting device in such a manner that they may be readily removed therefrom for the addition or other changes of the cards therein. It is, therefore, desirable that provision be made to prevent the accidental removal of the frames from the supporting device during the manipulation thereof.

One of the objects of the invention, therefore, is to provide a device of the above type of index equipment, having these desirable features.

Another object of this invention is to provide an improved index equipment of the above type, which may be efficiently used, readily manipulated, relatively inexpensive to manufacture and which is adapted to receive a maximum number of frames or leaves.

Another object of this invention is to provide an improved index equipment particularly adapted to receive record bearing frames or leaves of the type, or similar to the type shown in the patent to R. D. Hayes, No. 1,223,168, dated April 17, 1917.

Still another object of this invention is to generally improve the construction of index equipment of the class to which this invention relates.

To these and other ends the invention consists of the novel features and combination of parts to be hereinafter described and claimed.

In the accompanying drawings:

Fig. 4 is a sectional view on line 4—4 of Fig. 3;

Fig. 7 is a front face view of a somewhat modified form of device embodying certain features of this invention;

Fig. 8 is a section on line 8—8 of Fig. 7;

Figure 1:
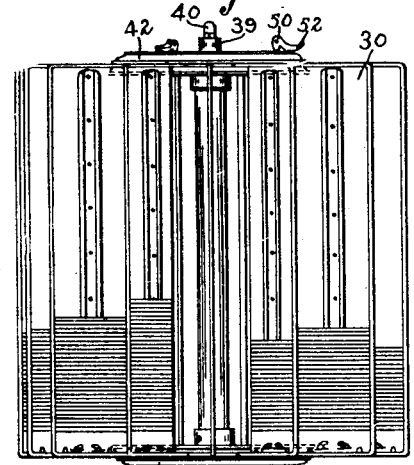
Fig. 1 is an elevation of one form of device, embodying the features of my invention.
Figure 2:
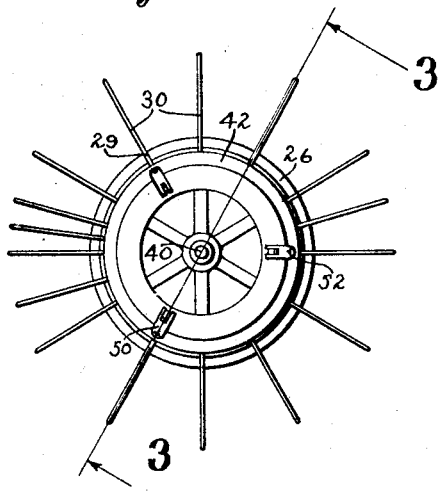
Fig. 2 is a top plan view of the part shown in Fig. 1.

The forms of index equipment selected to illustrate the features of this invention are particularly adapted for use with the type of record bearing frame or leaf shown and described in the above mentioned patent to R. D. Hayes, but it is to be understood that the features of this invention are capable of being incorporated with other forms of similar index equipment, which are adapted to be used with other forms of record bearing frames or leaves to obtain the advantages contemplated.

The form of device shown in Figs. 1 to 6, inclusive, is of the type generally known as a rotary equipment, wherein the track or holding and guiding means for the leaves or frames is in the form of an annulus while the form shown in Figs. 7 to 11 are generally known as a straight track equipment.

The rotary equipment of Figs. 1 to 6, inclusive, comprises a base plate 10 having a rod or shaft 11 extending upwardly substantially vertically therefrom. The shaft 11 is threaded into the base plate 10 at 12 and may be locked in place by means of a lock nut 13. A generally cylindrical frame is provided, comprising a disk-like lower track member 15 and an upper track member 16. These track members may be secured together by means of tie rods 17. The tie rods 17 are reduced in diameter at each end as at 18 and 19 and pass through openings 20 provided in lugs 21 on the inner periphery of the rim of the track members 15 and 16, respectively. A nut 22 secures the tie rod 17 to the lower track member 15 by engagement with the threads upon the end 18. The end 19 of the tie rod is provided with an adjusting nut 23 and a lock nut 24, whereby it is secured to the upper track member 16. The respective nuts 23 and 24 allow for vertical adjustment between the upper and lower track members 16 and 15, respectively. Each track member is provided with an annular rim 25 having a beveled outer surface 26 inclined toward the outer periphery from a groove 27, which in this instance, forms what is known as a track.

The groove or track 27 is adapted to receive the spherical ends 28 provided upon the arms 29, which extend from the index element frame or leaf 30. The arms 29 and the frames 30 are more or less springable and when the leaves are mounted upon the supporting device, the beveled surface 26 causes the arms to spring apart until the spherical or enlarged ends 28 cooperate with the groove or track 27. At this point the arms 29 are relieved from the spring tension and the spherical ends 28 drop into the grooves 27. The arms 29 in the particular type of leaf illustrated in the drawings, are all set slightly toward each other, as at 31, so that the only engagement that these arms have with the supporting device is within the grooves or tracks 27 by the spherical ends 28. The engagement above noted is such that the leaves or frames 30 are free to swing about the enlarged ends 28 as a pivot point and to allow the leaves to be moved around the track members into other positions relatively to the same.

The upper and lower track members 16 and 15, respectively, are spaced apart at the center thereof by means of a tubular spacing member 32, which engages the track members 15 and 16 within a counterbore in the hub portions 33 and 34, respectively. The hub portions 33 and 34 are provided with openings 35 of suitable diameter to act as bearings so that the device is allowed to rotate about the shaft 11. Preferably, a ball thrust bearing 36 is provided between the hub portion 33 and the base 10, in order to reduce friction at this point.

The shaft 11 extends beyond the upper track member 16, terminating in a reduced portion 37 and a threaded end 38. A collar 39 is provided about the portion 37, and a nut 40 cooperates with the collar 39 to secure the frame upon the shaft 11.

Below the lower track member 15 and above the upper track member 16, a leaf locking device is provided which, in this instance, is in the form of annular rings 41 and 42, respectively. The locking rings 41 and 42 are joined together by means of rods 43, three of the same being provided in the particular form of the device shown. The rods 43 are threaded into the lower ring 41 as at 44, lock nuts 45 being provided to insure that when once in position the rods will not be inadvertently loosened therefrom. From the lower locking ring 41 the rods 43 extend upwardly and pass loosely through suitable openings in lugs 46 and 47 provided upon the inner periphery of the annular rim 25 of the track members 15 and 16, respectively. The rods continue upwardly above the upper track member 16 and pass loosely through openings 48 in the upper locking ring 42.

Above the upper locking ring 42 the ends of the rods 43 are pivoted between arms 49 and 50 of cam members 51. The camming members 51 are provided with thumb pieces 52, and have cam surfaces 53 provided upon the outer edges of the arms 49 and 50. Due to the form of the cam surface 53, the camming members 51 are adapted through the rods 43 to raise the lower locking ring 41 and to lower the upper locking ring 42 simultaneously.

Coil springs 54 are provided about the rods 43, located between the lugs 47 and the upper ring 42. These springs are of sufficient strength to urge the upper ring 42 upwardly and to keep it continuously in contact with the cam surface 53.

Figure 3:
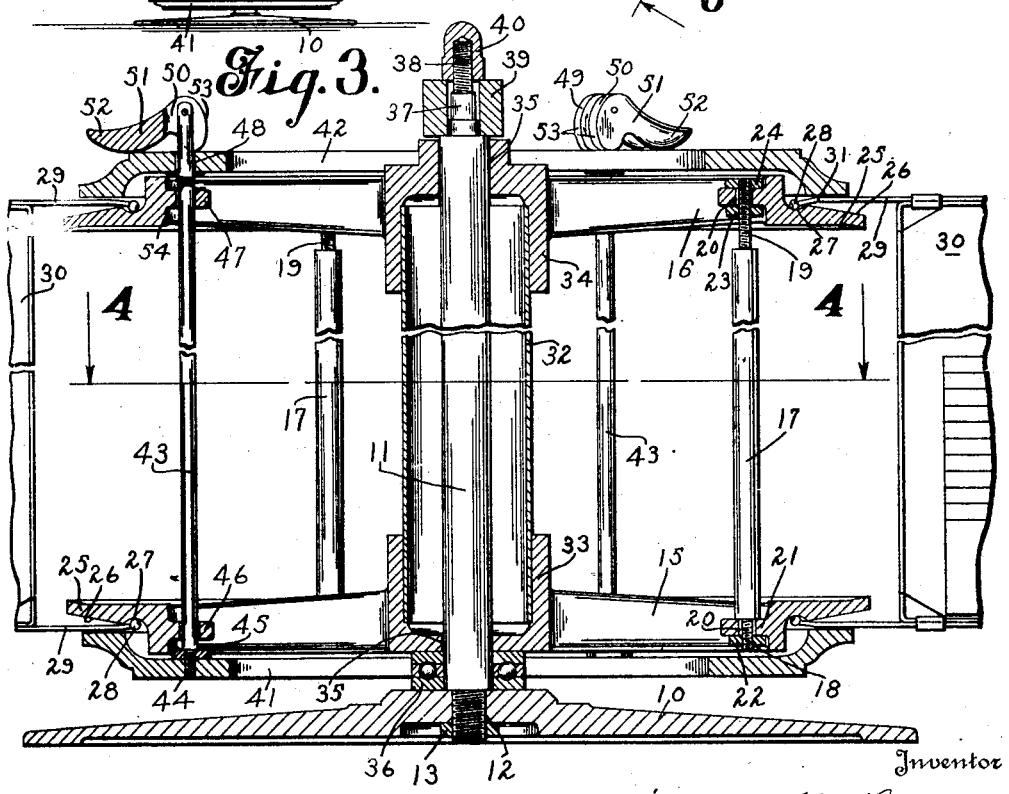
Fig. 3 is a sectional view on line 3—3 of Fig. 2.
Figure 5:
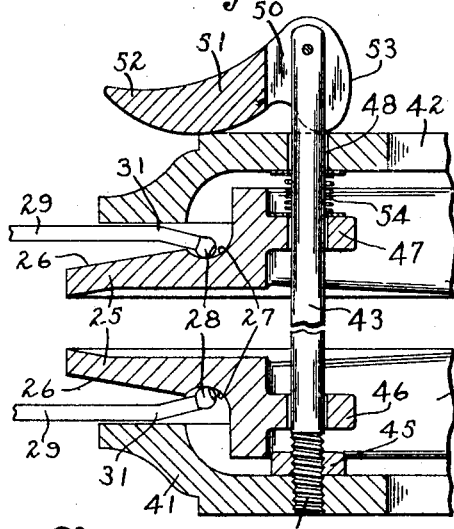
Fig. 5 is an enlarged partial view of certain parts of the device similar to the section shown in Fig. 3, certain parts being in one position to show the operation thereof.

When the cam member 51 is moved into the position shown in Figs. 3 and 5, the upper ring 42 is forced downwardly against the tension of the spring 54, and the lower ring 41 is raised against the action of gravity into the respective positions shown in these figures. When the cam members 51 are moved into the position shown in Fig. 6, the rings 41 and 42 are released from the action thereof and assume the positions shown in this figure, due to the spring 54 acting against the upper ring 42 and gravity acting against the lower ring 41.

Figure 6:
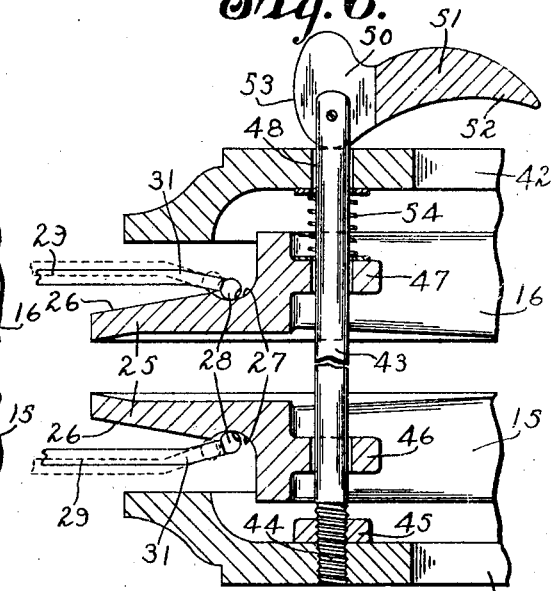
Fig. 6 is a view similar to Fig. 5, certain parts being in another position.

As shown in Figs. 5 and 6, the threaded portion 55 of the rods 43 is of sufficient length to allow for vertical adjustment of the rods 43. Such adjustment may be made by loosening the lock nuts 45 and rotating the rods 43 in the direction required by means of the cam members 51. The proper locked position for the upper and lower locking rings being shown in Figs. 3 and 5, wherein they clear the leaf arms 29 sufficiently to allow the leaves 30 to swing freely but not to be removed from the supporting device by allowing the spherical ends 28 to be disengaged from the grooves 27 of the track members 15 and 16. The lock nuts 45 are now tightened and the parts are in operative position.

The tension of the springs 54 are preferably of such strength that the locking rings 41 and 42 are substantially at all times equally spaced from the respective adjacent track members, and due to the novel construction of this locking arrangement the locking rings are what might be termed "floating" and therefore, should one of the arms of a leaf contact with one of the locking rings, both rings would give sufficiently to allow the leaf to swing.

In the straight track embodiment shown in Figs. 7 and 8, the track members 60 and 61 are secured upon a standard 62 by being mounted upon vertical arms 63 and 64 thereof. Pins 65 are provided adjacent the ends of the track members 60 and 61 to prevent the enlarged portions of the spherical ends of the arms of the leaves from slipping out of the groove of the track members. The locking bars 66 and 67 in this form of device are slidably secured to the frame arms 63 and 64 by means of screws 68, which pass through vertically elongated openings 69, provided in the bars 66 and 67. The locking bars 66 and 67 are joined together by a rod 70 in the same manner as the locking rings 41 and 42 are joined by the rod 43, described above. The spring 71, in this instance, acts against the bar 66 and a member 72 secured to the upper track member 60. The operation and the advantages of the embodiment shown in Figs. 7 and 8 are the same as those previously described regarding the rotary equipment shown in Figs. 1 to 6, inclusive.

Figure 9:
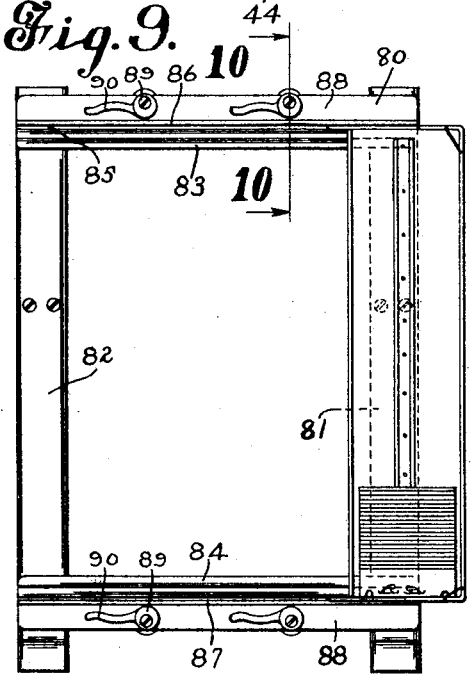
Fig. 9 is a front face view of a device somewhat similar to that shown in Fig. 7 of a modified form of construction, and embodying certain features of this invention.
Figure 10:
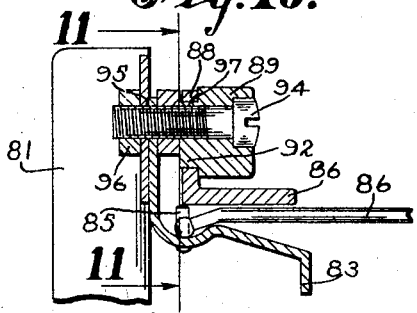
Fig. 10 is a section on line 10—10 of Fig. 9.
Figure 11:
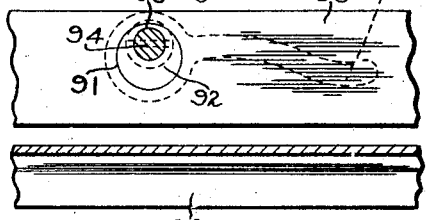
Fig. 11 is a section on line 11—11 of Fig. 10.

The modifications shown in Figs. 9 to 11, inclusive, show a straight track device comprising a frame 80, and having vertically extending arms 81 and 82 to which the upper and lower track members 83 and 84, respectively, are secured. Pins 85 serve the purpose of preventing the arms 86 of a leaf from sliding from the track members.

Upper and lower locking bars 86 and 87 are provided, each of which has a vertically extending portion 88. A plurality of camming members 89 are provided, each of which comprises a handle portion 90 and a hub portion 91. The hub portion 91 is reduced in diameter as at 92 and is provided with a bore 93 therethrough, which is eccentric to the axis of the hub portion. A screw 94 passes through the bore 93 and is threaded into the track 83 at 95, being locked into position by a lock nut 96.

The portion 92 passes through and rotates within an opening 97 in the vertical portion 88 of the respective bars 86 and 87. When rotated within the opening 97, the eccentric 92 raises or lowers the locking bar at this point, which allows the arms 86 of the leaves to be removed from the track members. There being no connection between the respective camming members 89, each must be individually operated both at the top and bottom, in order to operate the upper and lower locking bars.

While I have shown and described certain preferred embodiments of my invention, it is to be understood that the same is not to be limited thereto in all of its details, but is capable of many modifications and variations which will lie within the spirit of the invention and in the scope of the appended claims.

What I claim is:

1. In an index leaf support of the type described, upper and lower leaf engaging members, a pair of locking rings disposed one above said upper member and one below said lower member, and means to move said rings toward and away from said members substantially simultaneously.

2. In an index leaf support of the type described, upper and lower leaf engaging members, a pair of locking rings disposed one above said upper member and one below said lower member, and means to lower the upper ring and to raise the lower ring substantially simultaneously.

3. In an index leaf support of the type described, upper and lower leaf engaging members, a pair of locking rings disposed one above said upper member and one below said lower member, and means connecting said rings together, said means being adapted to move said rings into and out of locking position relatively to said upper and lower leaf engaging members.

4. In an index or file, an index leaf supporting frame comprising an upper supporting member, a lower supporting member, said members being connected together and cooperating to engage a pair of arm-like extensions of an index leaf or the like to support the same, a locking member spaced from and parallel with each of said supporting members, and means connecting said locking members together, said means including means to move said locking members toward and away from the supporting members respectively adjacent thereto to prevent and allow the disengagement of the arm-like extensions from said supporting members.

5. In an index or file, an index leaf supporting frame comprising an upper supporting member, a lower supporting member, said members being connected together and cooperating to engage a pair of arm-like extensions of an index leaf or the like to support the same, a locking member spaced from and parallel with each of said supporting members, and means connecting said locking members together, said means comprising a rod secured to one of said locking members and loosely passing through the other of said locking members, said rod being controlled by a cam member whereby said locking members are caused to move toward and away from the supporting members respectively adjacent thereto as and for the purpose described.

6. In an index or file, an index leaf supporting device comprising a base having a frame rotatably mounted thereon, said frame comprising upper and lower disk-like leaf supporting members, each member having a groove in the upper and lower face thereof respectively, an index leaf provided with a pair of arm-like extensions, said arm-like extensions being adapted to engage said supporting members within the grooves therein, a pair of locking rings disposed one above the upper member and the other below the lower member, said rings extending over the arm-like extensions of said index leaf, and means to draw said rings toward each other into close proximity to said arm-like extensions, thereby preventing the removal of said arm-like extensions from the grooves in said members.

7. In an index leaf support, a pair of spaced parallel leaf engaging members, locking means cooperating with each of said members, and means for simultaneously operating the locking means for each member.

8. In an index leaf support, upper and lower leaf engaging members, normally inoperative locking means cooperating with each of said members, and a single operating means for the locking means of each member for retaining said means in locking position.

9. In an index leaf support, upper and lower leaf engaging members, locking members movable relative to each leaf engaging member, and conjointly operated means for operating said locking members into locking and unlocking relation.

10. In an index leaf support, upper and lower leaf engaging members, locking members movable relative to said leaf engaging members, means for normally moving said locking members into unlocking position relative to said leaf engaging members, and means connecting said locking members operable to simultaneously move said locking members into locking cooperation with said leaf engaging members.

11. In an index leaf support, upper and lower leaf engaging members, locking means operably mounted adjacent with each of said members, and cam operated means for operating said locking means into locking and unlocking cooperation with said members.

12. In an index leaf support, upper and lower leaf engaging members, means adjustably connecting said members, locking members movably mounted adjacent with each leaf engaging member, and conjointly operated means for moving said locking members into and out of locking cooperation with said leaf engaging members.

13. In an index leaf support, upper and lower leaf engaging members, locking means movably mounted adjacent with each of said members, means slidable in said members connecting the locking means for each member, and means for operating said locking means into and out of locking cooperation with said leaf engaging members.

14. In an index leaf support, a pair of spaced leaf engaging members, locking means movably mounted adjacent with each leaf engaging member, means slidably supported by said leaf engaging members connecting said locking means, and means carried by the last named means operable to move said locking means into and out of locking cooperation with said leaf engaging members.

15. In an index leaf support, a pair of spaced leaf engaging members, locking means movably mounted adjacent with each leaf engaging member, means slidably supported by said leaf engaging members connected to the locking means for one of said members and slidably engaged with the other locking means, and means carried thereby cooperating with said locking means operable for moving said locking means into and out of locking cooperation with said leaf engaging members.

16. In an index leaf support, a pair of spaced relatively adjustable leaf engaging members, locking means movably mounted adjacent with each of said members, and means carried by said leaf engaging members for moving said locking means into and out of locking cooperation with said leaf engaging members.

In witness whereof, I have hereunto set my hand this 22nd day of July, 1925.

WILLIAM H. DAY.

CERTIFICATE OF CORRECTION.

Patent No. 1,695,322.                     Granted December 18, 1928, to

WILLIAM H. DAY.

It is hereby certified that error appears in the printed specification of the above numbered patent requiring correction as follows: Page 4, lines 35, 42, 49, 57, 66 and 79, claims 11, 12, 13, 14, 15 and 16 respectively, strike out the word "with"; and that the said Letters Patent should be read with these corrections therein that the same may conform to the record of the case in the Patent Office.

Signed and sealed this 5th day of February, A. D. 1929.

(Seal)

M. J. Moore,
Acting Commissioner of Patents.